July 13, 1954   O. V. STREED, SR., ET AL   2,683,613
REMOVABLE SPLIT PIPE FLANGE
Filed April 19, 1951
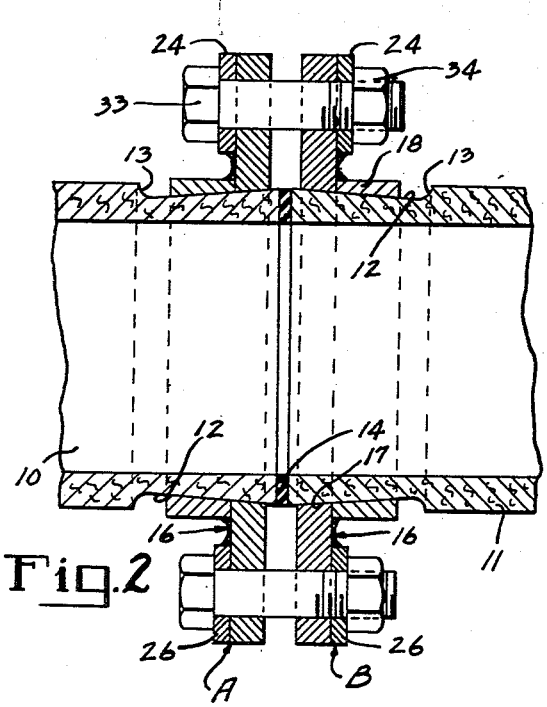
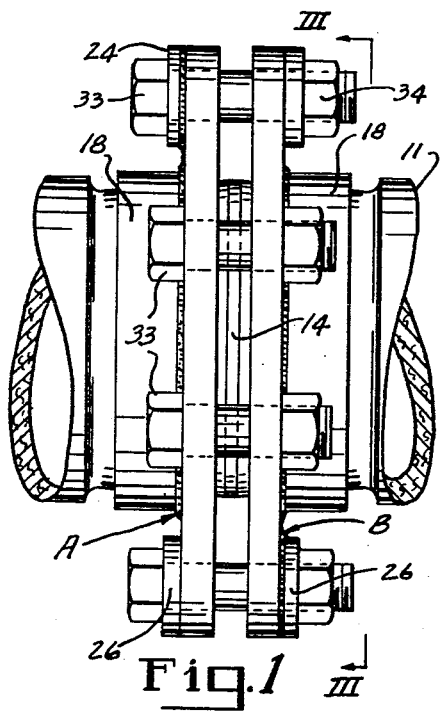
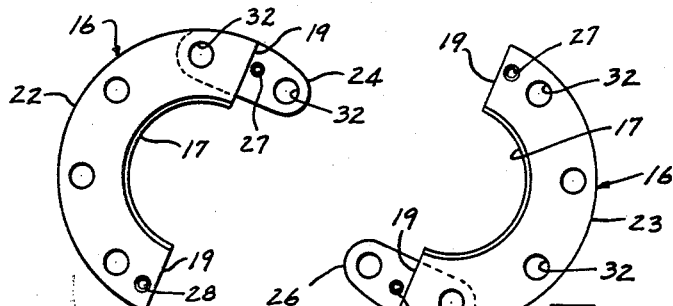
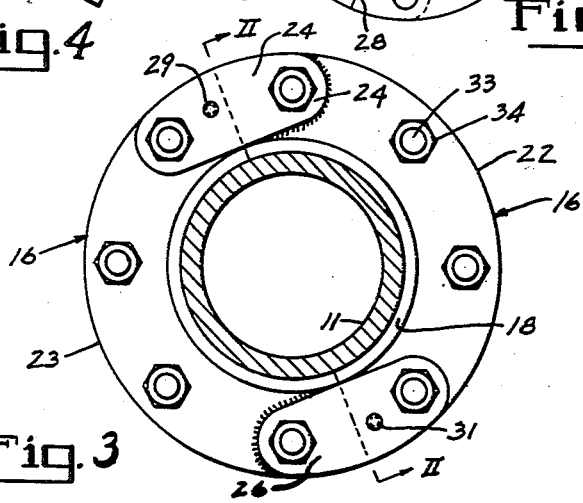
INVENTOR.
WILLIAM R. STREED
OLOF V. STREED, SR.
BY
*Jennings & Carter*
ATTORNEYS Patented July 13, 1954

2,683,613

UNITED STATES PATENT OFFICE 2,683,613

REMOVABLE SPLIT PIPE FLANGE

Olof V. Streed, Sr., and William R. Streed, Gadsden, Ala.

Application April 19, 1951, Serial No. 221,876

3 Claims. (Cl. 285—142)

This invention relates to a split flange for securing pipes together in abutting end to end relation and while not limited thereto relates particularly to such a flange especially suitable for connecting non-ferrous pipes, such for instance as pipe made of cement-asbestos material.

An object of our invention is to provide a flange which may be easily fabricated from sheet steel or iron materials of standard shapes and sizes, the parts of the flange being assembled as by welding, thus to provide a flange which is economical of manufacture, strong and of less weight than a cast flange of similar strength.

Our invention contemplates a split flange in which the bolt carrying portion is made of a ring of sheet steel and in which the bore is taper machined both through the bore of the ring and through an axial extension ring welded to the face of the bolt ring, together with lap bars for holding the flange assembled.

Another object is to provide a flange of the character designated in which the lap bars and the portion of the opposite split bolt ring overlying the same are provided with tapered openings for receiving tapered pins, thus assuring that the bore of the halves of the flange are properly machined and assuring that the halves of the flange fit properly when the same are assembled about the pipe to be clamped.

A further object is to provide a split flange of the character designated which may be rotated after it is placed on the pipe and before the clamping bolts are drawn up, facilitating the positioning of the bolts and nuts at the most convenient location for tightening during the assembly of the flange.

Apparatus illustrating the features of our invention is shown in the accompanying drawing forming a part of this application in which:

Fig. 1 is an elevational view of our improved flange in place on the ends of a pair of pipes, holding them together, the pipes being broken away and in section;

Fig. 2 is a detail sectional view taken generally along line II—II of Fig. 3;

Fig. 3 is a detail sectional view taken generally along line III—III of Fig. 1;

Fig. 4 is a side elevational view of one half of one of the split flanges; and,

Fig. 5 is a view corresponding to Fig. 4 and showing the other half of one of the split flanges.

Referring now to the drawings for a better understanding of our invention, we show a pair of pipes 10 and 11 which it is desired to join in leakproof, end to end relation. Each of the pipes 10 and 11 is provided adjacent its end with a tapered portion 12. As will be seen, the tapered portions or seats 12 decrease in diameter from the ends of the pipes and terminate at their rear ends in radii 13. Interposed between the ends of the pipes 10 and 11 is a gasket 14 of rubber or the like which serves to provide a leak-proof joint when the pipes 10 and 11 are drawn axially together.

Our improved device comprises a pair of identical clamping units or flanges A and B. Since the units A and B are identical, a description of one will suffice for both.

In fabricating the units A and B we commence with an annular plate, indicated in the drawings by the numeral 16. The bore 17 of the plate may initially be roughed out as by burning the same with a cutting torch. The plate 16 thus is initially in the form of a ring with a rough, unfinished bore 17.

To one face of the solid ring 16 we weld a short length of steel tubing 18 or a ring formed from any other stock. The ring 18 preferably is welded continuously around its periphery in abutting relation to a face of the plate 16, as illustrated in the drawings. We now split the plate 16 and the ring 18 along the diametrical line 19, providing a split unit, the halves of which are indicated by the numerals 22 and 23 throughout the drawings. We now mate the halves, forming a circle with the same ends abutting along the line 19 as originally cut and secure the halves together temporarily in a jig or other suitable fixture. On one end of the half 22 we weld a lap bar 24. On the opposite end of half 23 we weld a similar lap bar 26. While still holding the halves assembled in the jig or fixture we temporarily tack weld the projecting end of the bar 24 to the half 23 and similarly tack weld the projecting end of bar 26 to the half 22.

While the halves are still temporarily tack welded together we drill and ream a pair of tapered holes 27 and 28 in the lap bars 24 and 26 and insert therein tapered pins 29 and 31.

With the pins 29 and 31 in place and with the tack welds still unbroken, we mount the assembled device in a lathe or the like and machine the bore 17. We provide the bore with a taper complementary to the taper 12 on the ends of the pipes 10 and 11. We now drill a series of bolt holes 32 through the flange. It will be noted that since the holes are drilled while the halves are assembled we line drill one of the holes 32 through the portions 22 and 23 and the respective lap bars 24 and 26. Likewise, for the purpose of simplicity of manufacture we prefer to drill all of the bolt holes while the device is initially assembled with the tack welds and the tapered pins 29 and 31.

After all of the foregoing we remove the pins 29 and 31, break the tack welds and grind the rough edges of the device and thus finish the flange, making it smooth and capable of being handled without injury in the bare hands.

From the foregoing the method of constructing and using our improved split flange will be readily appreciated and understood. The flanges are ordinarily shipped to the user with the pins 29 and 31 in place and with a supply of draw bolts 33 and nuts 34 therefor in place in the holes 32. The user removes the bolts 33 and nuts 34 and removes the pins 29 and 31, parting the flanges. They are now placed about the tapered seats 12 of the pipes and the bolts 33 are put in place with the nuts 34 thereon. It will be apparent that when the nuts are drawn up the complementary tapers of the bores 17 and the seats 12 cause the flanges to tightly grip the ends of the pipe consequently drawing the pipes axially together, compressing the gasket 14 and effectively sealing the pipe.

It will be noted that through the provision of the taper pins passing through the overlying ends of the lap bars 24 and 26 and the ends of the respective plate halves and their insertion prior to finishing the bore 17, we provide an extremely accurate method of rematching the halves of the units A and B when assembling them about the pipe. Thus, with the pins in place the taper of the base of the clamp is accurately re-established and drawing up of the clamping bolts seats the clamp evenly and accurately about the tapered seats of the pipe. It will further be noted that both of the lap bars 24 and 26 are placed on the outer sides of the split plate 16. The bars are thus out of the way so that if necessary the two flanges may be drawn close together. When installing our improved flange the same may be placed about the pipe and the section or units A and B may be rotated prior to drawing up the nuts 34, thus positioning the nuts and bolts in the most convenient location for placing wrenches or other tools thereon.

From the foregoing it will be apparent that we have devised an improved fabricated split flange for pipes. As stated, our invention is particularly adapted for use in conjunction with pipes 10 and 11 made of cement-asbestos material wherein it is desired to have a relatively long bore 17 to engage a considerable surface of the tapered seats 12. Our invention lends itself readily to mass production methods of fabrication and the flange is considerably lighter for given strength than cast flanges. Further, due to the matching of the halves in the manner stated herein we assure that the tapered bore is concentric when the device is applied to the pipes and therefore eliminate eccentricity which would damage the pipes and prevent proper drawing up of the same.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a removable pipe flange, a clamping bolt ring comprising two substantially identical semi-circular halves of uniform thickness with the ends thereof substantially abutting, a lap bar fixedly secured to one end of each half for overlying the opposite end of the other half when the halves are mated, there being aligned uniformly tapered openings through the overlying ends of the lap bars and the associated end of the opposite ring half, pins complementarily tapered to the tapered openings in the lap bars and associated ring half ends and fitting snugly therein, there being a bolt hole passing through the overlying end of each of the lap bars and the associated end of the opposite ring half, and clamping bolts passing through said bolt holes.

2. In a removable pipe flange, a clamping bolt ring split diametrically into two substantially identical semi-circular halves of uniform thickness and with the ends thereof abutting, a diametrically split semi-circular ring fixedly secured to corresponding faces of the bolt ring and forming axial extensions of the ring halves, there being a pipe engaging tapered bore extending through the split ring and said other ring, a lap bar rigidly fixed to one end of each of the split bolt ring halves and overlying the associated end of the opposite bolt ring half, there being aligned uniformly tapered openings through the overlying ends of the lap bars and the associated ends of the opposite bolt ring halves, and pins complementarily tapered to the tapered openings in the lap bars and associated ring halves and fitting snugly therein, there being clamping bolt holes passing through the overlying ends of the lap bars and the associated ends of the bolt ring halves.

3. In a removable pipe flange, a bolt clamping ring formed of flat metal stock split along a diametrical plane into substantially identical semi-circular halves of uniform thickness and with the ends thereof abutting, a ring of steel welded to the face of the bolt ring and similarly split into substantially identical halves along the same diametrical plane on which the clamping ring is split, there being a common, pipe engaging tapered bore in the rings, lap bars secured rigidly to one end of each of the clamping ring halves for overlying the associated end of the opposite clamping ring half when the two halves are mated, there being a uniformly tapered opening passing through each of the overlying ends of the lap bars and the associated end of the opposite clamping ring half, pins complementarily tapered to the tapered openings in said lap bars and associated ring half ends and fitting snugly therein, there being a clamping bolt hole passing through the overlying ends of the lap bars and the associated ends of the opposite clamping ring half, and clamping bolts fitting in the bolt holes.

References Cited in the file of this patent

UNITED STATES PATENTS

| Number | Name | Date |
|---|---|---|
| 139,877 | Dame | June 17, 1873 |
| 401,996 | Brogden | Apr. 23, 1889 |
| 696,603 | Smith | Apr. 1, 1902 |
| 758,102 | Powers | Apr. 26, 1904 |
| 925,770 | Herrick | June 22, 1909 |
| 943,461 | Reynolds | Dec. 14, 1909 |
| 1,062,438 | Clark | May 20, 1913 |
| 1,423,754 | Clark | July 25, 1922 |